(12) United States Patent
Kim

(10) Patent No.: US 11,608,013 B2
(45) Date of Patent: Mar. 21, 2023

(54) VEHICLE FRUNK TRIM

(71) Applicant: SEOYON E-HWA CO., LTD., Anyang (KR)

(72) Inventor: Dong Hwan Kim, Seoul (KR)

(73) Assignee: SEOYON E-HWA CO., LTD., Anyang (KR)

( * ) Notice: Subject to any disclaimer, the term of this patent is extended or adjusted under 35 U.S.C. 154(b) by 0 days.

(21) Appl. No.: 17/485,565

(22) Filed: Sep. 27, 2021

(65) Prior Publication Data

US 2022/0097610 A1    Mar. 31, 2022

(30) Foreign Application Priority Data

Sep. 28, 2020 (KR) .......................... 10-2020-0125392

(51) Int. Cl.
*B60R 13/01* (2006.01)
*B60R 5/02* (2006.01)

(52) U.S. Cl.
CPC .............. *B60R 13/011* (2013.01); *B60R 5/02* (2013.01)

(58) Field of Classification Search
CPC .. B60R 5/02; B60R 5/04; B60R 5/045; B60R 5/048; B60R 13/011
USPC .............................................. 296/24.4, 37.16
See application file for complete search history.

(56) References Cited

U.S. PATENT DOCUMENTS

| 7,121,601 | B2 * | 10/2006 | Mulvihill | B60R 7/02 |
| | | | | 296/37.16 |
| 10,195,999 | B1 * | 2/2019 | Glickman | B62D 25/085 |
| 11,267,405 | B2 * | 3/2022 | Gill | B60R 7/02 |
| 2013/0320694 | A1 * | 12/2013 | Dinger | B60R 5/04 |
| | | | | 296/37.16 |
| 2019/0232875 | A1 * | 8/2019 | Flores Marin | B65D 7/24 |
| 2022/0185192 | A1 * | 6/2022 | Gill | B60R 5/02 |

FOREIGN PATENT DOCUMENTS

| DE | 102006021551 A1 | 11/2007 |
| DE | 102010024544 A1 | 12/2011 |
| EP | 3569449 A1 | 11/2019 |
| JP | 2001233136 A * | 8/2001 |

OTHER PUBLICATIONS

OA dated Nov. 18, 2022 by the PTO (DE).

* cited by examiner

*Primary Examiner* — Jason S Daniels
(74) *Attorney, Agent, or Firm* — Harvest IP Law LLP

(57) ABSTRACT

The present invention relates to a vehicle frunk trim. A storage-box accommodation space is formed on one side of the frunk trim, and a flexible storage box is mounted on an inside surface of a sidewall, positioned in the direction of the storage-box accommodation space, of a body portion. For use, the storage box may extend to a desired length from the storage-box accommodation space. Articles is put in order outside the storage box and is stored in the storage box without unoccupied spaces in the storage box. Thus, a state where the articles are put in order is maintained, and noise due to collision between the articles is reduced.

3 Claims, 4 Drawing Sheets

VEHICLE FRUNK TRIM

CROSS-REFERENCE TO RELATED APPLICATION

This application claims priority to Korean Patent Application No. 10-2020-0125392, filed on Sep. 28, 2020, the disclosure of which is incorporated herein by reference in its entirety.

TECHNICAL FIELD

The present invention relates to a vehicle frunk trim and, more particularly, to a frunk trim that is installed within a front portion of a vehicle body, that is, under a bonnet to store an article.

BACKGROUND ART

Electric vehicles have no engine, and therefore a wide space is provided under a bonnet in the front portion of a vehicle. This space, like a trunk in the rear potion of a vehicle, is utilized as a storage space for storing an article. The space is hereinafter referred to as a frunk (which is coined to express "front" and "trunk" together).

The "frunk trim" manufactured using plastic-injection molding is installed within the front portion of a vehicle body to form a frunk, that is, a space for storing an article. As illustrated in FIG. 1, a frunk trim 1 is box-shaped and is open at the top. The frunk trim 1 is installed in an internal space in the front portion of the vehicle. A gap between the frunk trim 1 and the vehicle body (a front shroud panel and both fender panels) is covered by a cover trim 2. A weatherstrip 3 is installed along a border line between the frunk trim 1 and the cover trim 2 and thus is brought into contact with a lower surface of the bonnet. Accordingly, the frunk trim 1 is sealed. The frunk trim 1 and the cover trim 2 is manufactured into one piece using plastic-injection molding.

On the other hand, various articles, such as a vehicle maintenance tool, a cleaning tool, and articles for camping and outdoor activities is stored within the frunk trim 1. However, a state where articles are put in order cannot be maintained due to vibration occurring while the vehicle travels. Furthermore, noise occurs because the articles fall sideways or collide with each other.

In order to solve this problem, in the related art, a separate storage box is placed in the frunk trim 1, and articles are stored within the separate storage box. However, in such a case, the articles also vibrate within the separate storage box. Therefore, the separate storage box is not so effective in reducing vibration and noise.

DOCUMENTS OF RELATED ART

Patent Documents (Patent Document 1) EPO Patent Application Publication No. FP3569449A1 (published on Nov. 20, 2019)

DISCLOSURE

Technical Problem

An objective of the present invention, which is made in view of the problem mentioned above, is to provide a vehicle frunk trim capable of stably maintaining a state where articles are put in order and preventing noise from occurring when the articles fall sideways or collide with each other.

Technical Solution

According to the present invention, there is provided vehicle frunk trim a body portion; and a flexible storage box mounted on one sidewall surface of the body portion.

In the vehicle frunk trim, a storage-box accommodation space is formed in the vicinity of the one sidewall surface of the body portion, and the flexible storage box is mounted on the one sidewall surface, positioned in the direction of the storage-box accommodation space, of the body portion.

In the vehicle frunk trim, the flexible storage box includes a plurality of partition panels; a connection portion connecting respective flank ends of the partition panels on one side thereof, respective flank ends of the partition panels on the other side thereof, and respective lower ends of the partition panels, and the connection portion is made of a material that is easily foldable and expandable.

In the vehicle frunk trim, flank and bottom surfaces of the connection portion is repeatedly bent along the center lines thereof in a manner that is directed inward the storage box, thereby forming a folding line on the connection portion.

In the vehicle frunk trim, a first holding member attaching the partition panels to each other is installed on a flank surface of the partition panels.

In the vehicle frunk trim, a second holding member attaching an outermost partition panel that serves as a free end portion of the flexible storage box to a sidewall surface of the body portion is installed on the outermost partition panel.

In the vehicle frunk trim, a third holding member attaching a lower plate formed on a lower end portion of the outermost partition panel to a bottom surface of the body portion is installed on the lower plate.

In the vehicle frunk trim, a magnet or a velcro fastener is used as the first holding member holding member, the second holding member, and the third holding member.

Advantageous Effects

According to the present invention, as described above, the frunk trim including the flexible storage box is provided.

The storage box can be accommodated in a folded (contracting) state within the storage-box accommodation space formed on an end of the frunk trim. Thus, an internal space in the frunk trim can be maximally widened for use.

Since the storage box is flexible, the storage box, when used, can expand (spread out) to a desired size (length) from the storage-box accommodation space. The plurality of the partition panels divide an internal space in the storage box into small spaces. A distance between each of the small spaces varies depending on how far the storage box expands. Thus, an article can be stored in a stable state between each of the partition panels.

Therefore, although vibration and shock occur while a vehicle travels, a state where articles are put in order can be stably maintained without the articles falling sideways and colliding with each other. Thus, noise can be prevented from occurring.

MODE FOR INVENTION

Various modifications to the present invention would be made, and accordingly various embodiments of the prevent invention would be made. Among these embodiments, specific embodiments will be described in detail below with reference to the drawings. However, the detailed description of those specific embodiments is not intended to limit the present invention thereto. All alterations, equivalents, and substitutes that are included within the technical idea of the present invention should be understood as falling within the scope of the present invention. For clarification and convenience of description, line thickness, a size of a constituent element, and the like is illustrated in an exaggerated manner in the accompanying drawings.

In addition, terms that will be used below are ones defined by considering functions for which such terms are used according to the present invention, and may vary according to the intention of a user or a manager or according to the common practices in the art. Therefore, definitions of these terms should be stated in light of the details of the present specification.

A desirable embodiment of the present invention will be described in detail below with reference to the accompanying drawings.

Figure 1:
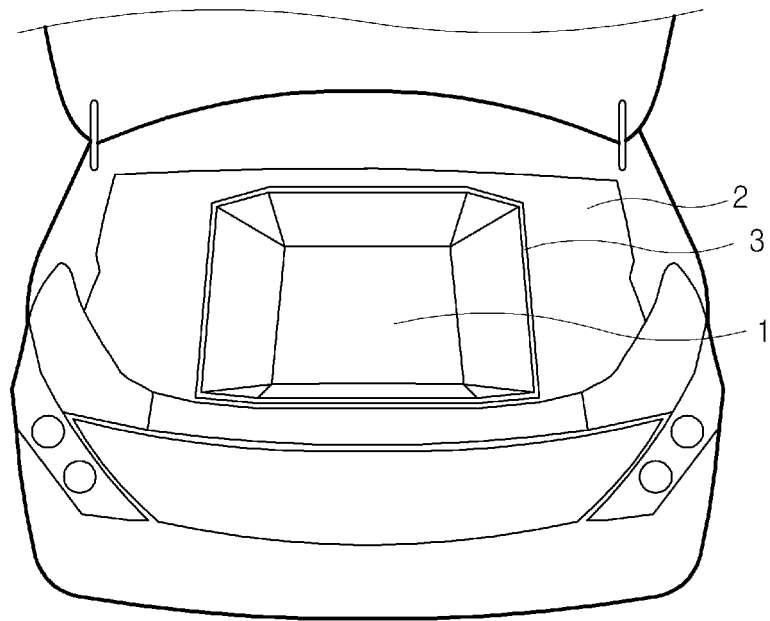
FIG. 1 is a view illustrating a state where a frunk is formed in a front portion of a vehicle.
Figure 2:
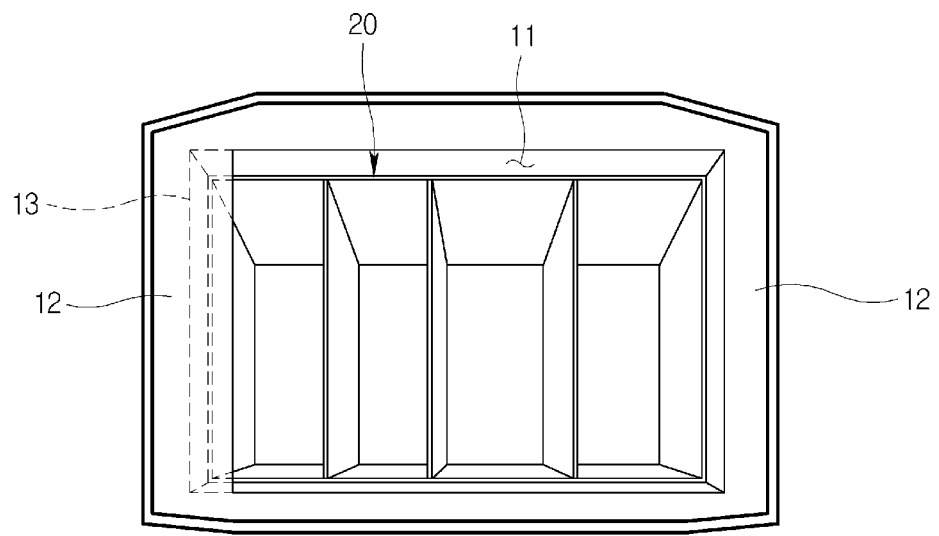
FIG. 2 is a perspective view illustrating a frunk trim according to the present invention when viewed from above the front portion of the vehicle, and illustrating a state where a storage box expands fully.
Figure 3:
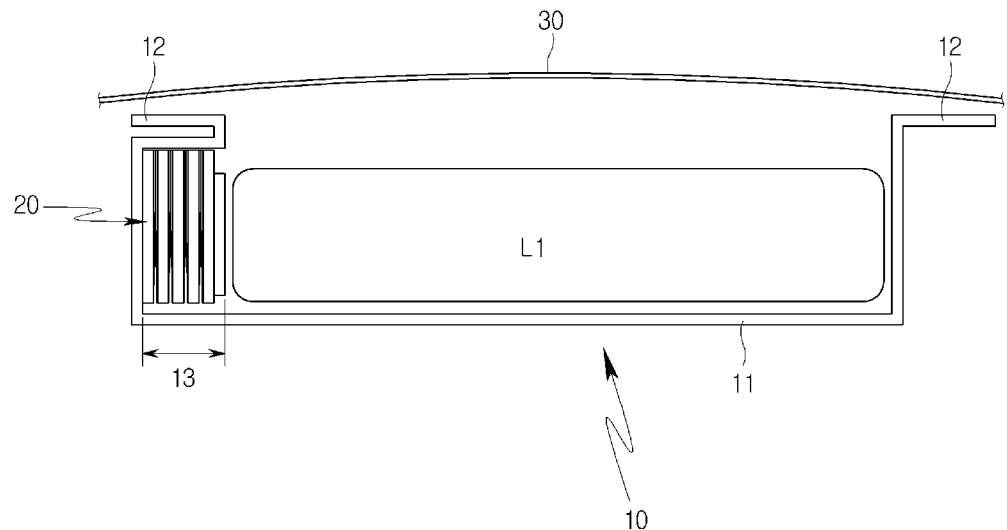
FIG. 3 is a vertically cross-sectional view illustrating the frunk trim according to the present invention and illustrating a state where the storage box is accommodated.

As illustrated in FIGS. 2 and 3, a vehicle frunk trim according to the present invention includes a body portion 11, an upper panel portion 12, and a flexible storage box 20. The body portions 11 is box-shaped and is open at the top. The upper panel portion 12 is formed, in the form of being horizontally bent, on an upper end of the body portion 11. The flexible storage box 20 is mounted on one sidewall surface of the body portion 11. Reference numeral 30 depicts a bonnet 30 that is schematically illustrated as being in a closed state.

The body portion 11 has approximately the shape of a rectangular box. A bottom surface and four sidewall surfaces extending from the bottom surfaces are all planes. The bottom surface and the four sidewall surfaces are connected to each other.

The upper panel portion 12 is formed to extend in the form of being horizontally bent in a manner that is directed outward from the sidewall surface of the body portion 11. The upper panel portion 12 is combined with a cover trim covering a space between the frunk trim and a vehicle frame.

The flexible storage box 20 is configured in such a manner to adjust a horizontal-direction length thereof. The flexible storage box 20 contracts for accommodation thereof when not in use and expands to store articles therein when in use.

When the flexible storage box 20 is not in use, the sidewall surface of the body portion 11 extends outward from the body portion 11 in order to accommodate the flexible storage box, and thus a storage-box accommodation space 13 is formed. After the storage-box accommodation space 13 is formed in this manner, the flexible storage box 20 is mounted (fixed) on an inside surface of the sidewall, positioned in the direction of the storage-box accommodation space 13, of the body portion 11.

Figure 4:
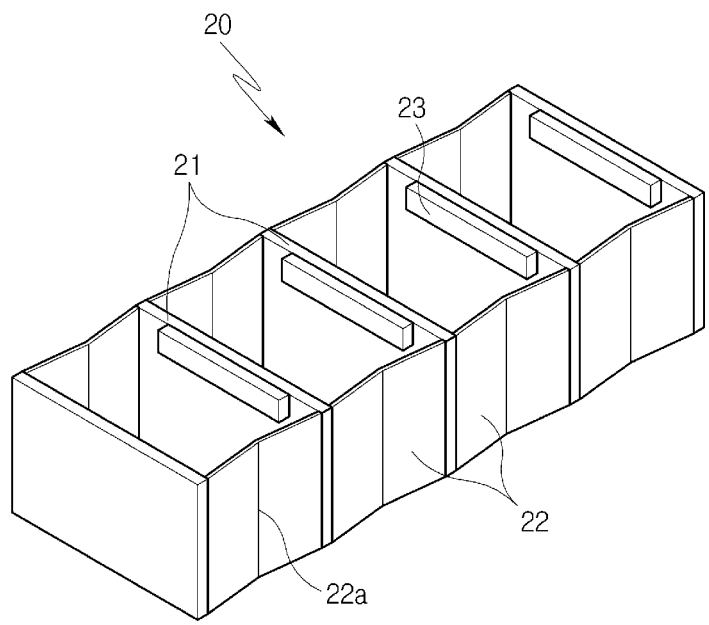
FIG. 4 is a perspective view illustrating a flexible storage box that is one constituent element of the frunk trim according to the present invention.
Figure 5:
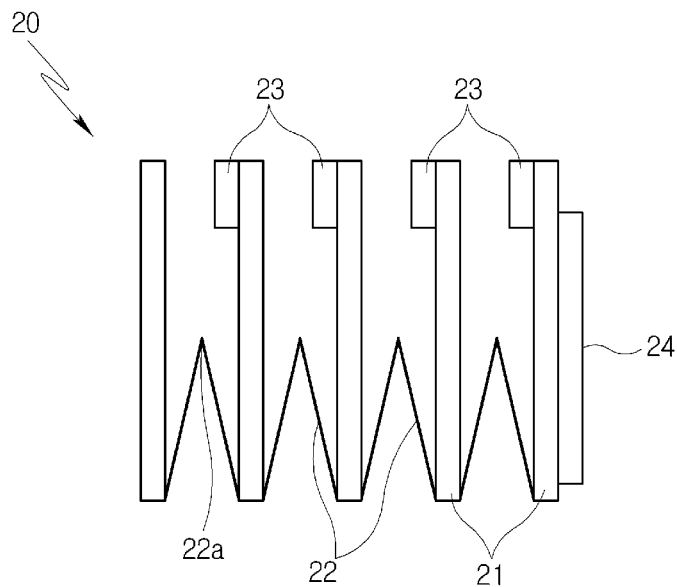
FIG. 5 is a vertically cross-sectional view illustrating the flexible storage box.
Figure 6:
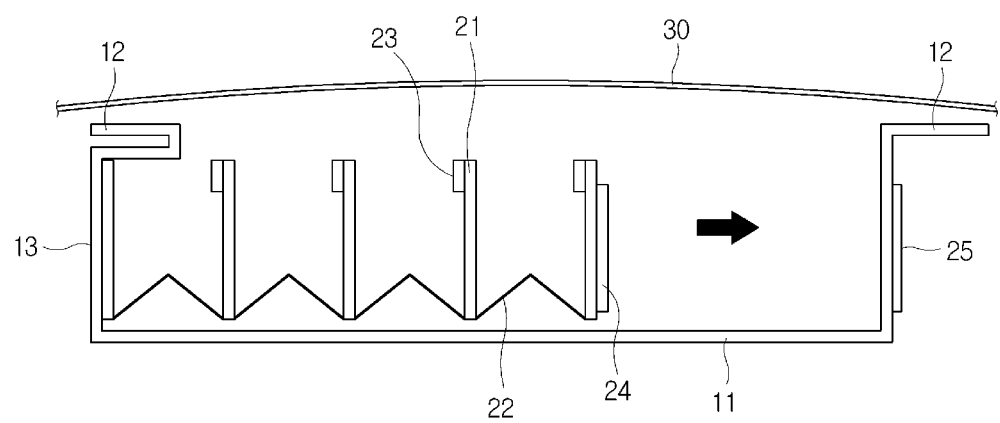
FIG. 6 is a view illustrating that the flexible storage box expands.

As illustrated in FIGS. 4 to 6, the flexible storage box 20 includes a plurality of partition panels 21 and a connection portion 22. The connection portion 22 connects the partition panels 21 to each other, thereby forming a storage space between each of the partition panels 21. The article is stored in the storage space.

The partition panels 21 each have the shape of a rectangular plate and are held in such a manner to maintain a state where the storage box 20 expands for use.

The connection portion 22 is made of a cloth material, such as non-woven fabric, and thus is easily foldable and expandable. The connection portion 22 connects respective flank ends of the partition panels 21 on one side thereof, respective flank ends of the partition panels 21 on the other side, and respective lower ends of the partition panels 21. That is, the connection portion 22 connects respective three ends of the partition panels 21 to each other except for respective upper ends thereof. Therefore, a plurality of article storage spaces are formed by the partition panels 21 and the connection portion 22 connecting the plurality of partition panels 21 to each other.

The connection portion 22 is attached to the respective flank (vertical) ends of the partition panels 21 on one side thereof, the respective flank (vertical) ends of the partition panels 21 on the other side thereof, and the respective lower ends (horizontal) of the partition panels 21 using an adhesive.

In addition, the partition panel 21 is built into a rectangular pocket made of the same cloth material as the connection portion 22, and then both flank end portions of the pocket and a lower end portion thereof is stitched on the connection portion 22 for connection.

In addition, folding line 22a is formed along the center line on the side and bottom of the connection portion 22. Therefore, the connection portion 22 can be easily folded in the inner direction of the storage box 20.

With the structure described above, the storage box 20 may contract in such a manner that the partition panels 21 overlap or may expand (spread out) in such a manner that the partition panels 21 are moved away from each other.

As described above, the storage box 20 is installed on one sidewall surface of the body portion 11. Therefore, the partition panel 21 that is one end portion of the storage box 20, that is, one outermost portion (the leftmost portion in FIG. 5) thereof is fixed on one sidewall surface of the body portion 11 using an adhesive or a screw (or a bolt). In addition, the partition panel 21 that is one end portion of the storage box 20 is fixed using various holding means, such as a grommet, a fastener, a clip, and a clamp.

In addition, of course, the storage box 20 is separated from the body portion 11 by removing the holding means.

As illustrated in FIG. 5, a first holding member 23 is installed on one flank surface of the partition panel 21 in order to maintain a state where the partition panel 21 overlap for accommodation.

As the first holding member 23, a velcro fastener or a magnet is used. In a case where the velcro fastener is used as the first holding member 23, it is desirable that a structure is employed in which the partition panel 21 is surrounded with the pocket made of a cloth material (a cloth material to which the velcro fastener is attachable). In this case, the velcro fastener bonded to a flank surface of the partition panel 21 is attached to a surface of the pocket surrounding a flank surface of the partition panel 21 facing the bonded velcro fastener, and thus the partition panels 21 is attached to each other.

In addition, in a case where the magnet is used as the first holding member 23, it is desirable that the partition panel 21 is a metal panel (attractable to a magnet) having a magnetic property. In this case, with magnetism of the magnet, the partition panels 21 is kept attached to each other.

On the other hand, as shown in FIG. 5, a second holding member 24 is installed on the partition panel 21 which is a free end (right end) of the storage box 20.

As the second holding member 24, the velcro fastener or the magnet may also be used. In a case where the velcro fastener is used as the second holding member 24, a cloth material, such as non-woven fabric, to which the velcro fastener is attachable, needs to be attached to a sidewall surface, facing the velcro fastener, of the body portion 11.

Figure 7:
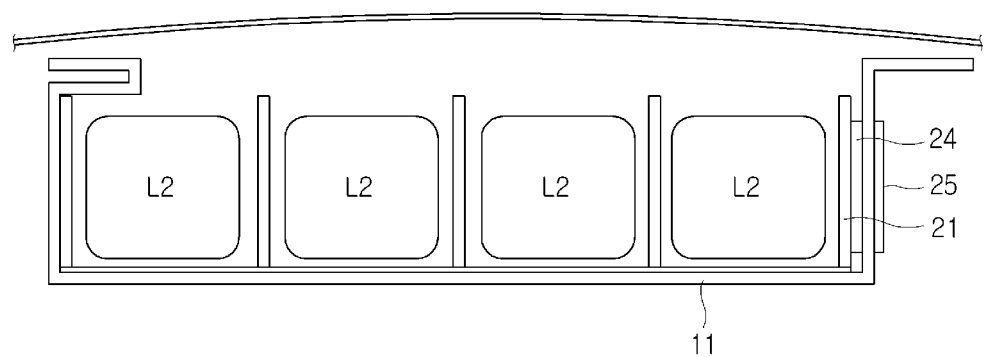
FIG. 7 is a view illustrating a state where the flexible storage box expands fully for use (a vertically cross-sectional view illustrating the frunk trim in FIG. 2)

In addition, in a case where the magnet is used as the second holding member 24, a magnetic plate 25 made of a metal material having a magnetic property needs to be attached to a sidewall surface, facing the magnet, of the body portion 11 in such a manner that the magnet is attracted to the magnetic plate 25. At this point, the magnetic plate 25 is installed on an inside sidewall surface of the body portion 11 and, as illustrated in FIG. 7, is installed on an outside sidewall surface thereof.

Figure 8:
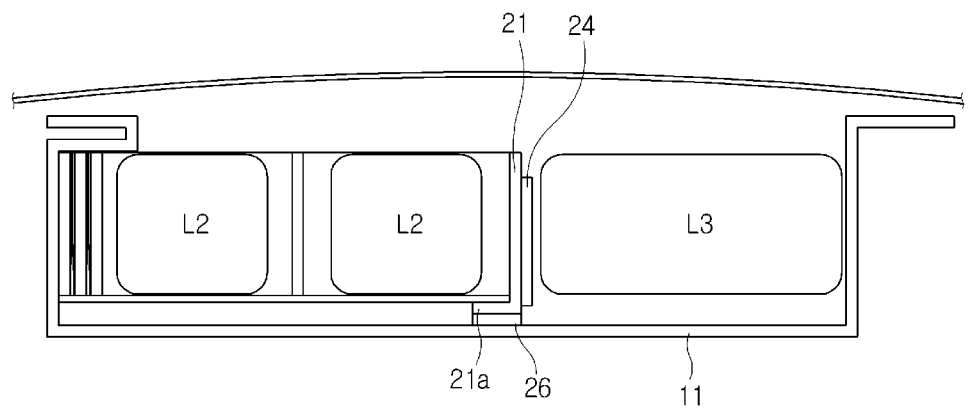
FIG. 8 is a view illustrating a state where the flexible storage box expands partly for use and a plane view illustrating a bottom surface of a body portion of the frunk trim.
Figure 8:
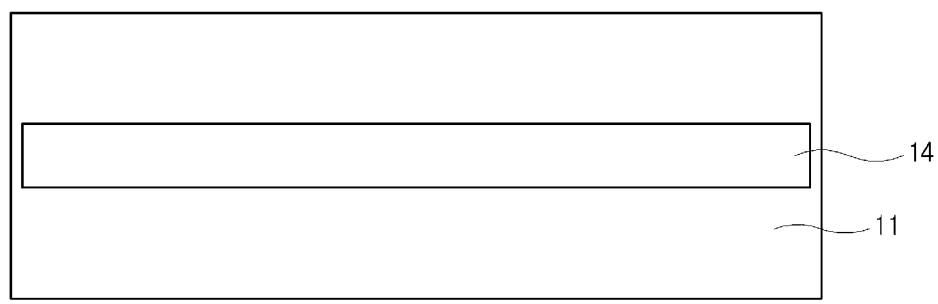

On the other hand, as illustrated in FIG. 8, a lower plate 21a is formed on a lower end portion of the partition panel 21 on which the second holding member 24 is installed. A lower end portion of the partition panel 21 extends in a perpendicularly bent manner, and thus the lower plate 21a is formed. A third holding member 26 is installed on a bottom surface of the lower plate 21a. When this is done, the storage box 20 may extend to an arbitrary length and then is fixed on a bottom surface of the body portion 11.

The velcro fastener or the magnet may also be used as the third holding member 26. In a case where the velcro fastener is used as the third holding member 26, a cloth material, such as non-woven fabric, to which the velcro fastener is attachable, needs to be attached to the bottom surface of the body portion 11.

In addition, in a case where the magnet is used as the third holding member 26, a magnetic plate 14 made of a metal material having a magnetic property needs to be attached to the bottom surface of the body portion 11 in such a manner that the magnet is attracted to the magnetic plate 14.

The magnetic plate 14 is installed on the bottom surface of the body portion 11 over an entire length, in a traverse direction, of the body portion 11 in a traverse direction of a vehicle (in a direction in which the storage box 20 contracts and expands). Therefore, an end portion of the storage box 20 is fixed, without any restriction, at an arbitrary position that varies according to a distance by which the storage box 20 expands.

On the other hand, the magnetic plates 14 and 25 may have the shape of a thin plate and thus is attached to the sidewall surface or the bottom surface of the body portion 11. Therefore, the protrusion of the magnetic plates 14 and 25 into a space in the body portion 11 is minimized. Thus, when the storage box 20 is used, damage to the storage box 20 or injury to a user can be prevented from occurring due to interference with the storage box 20, the user's sleeve, the user's hand, and the like.

In order to maximize the effect of preventing the interference, of course, the magnetic plates 14 and 25 is buried into the sidewall or the bottom surface of the body portion 11 using Insert injection molding process.

The vehicle frunk trim according to the present invention, which is configured as described above, is used as follows.

First, as described in FIG. 3, when the storage box 20 is not in use, the storage box 20 is caused to contract fully and is accommodated in the storage-box accommodation space 13 formed inward from one sidewall surface of the body portion 11.

To this end, the partition panel 21 that serves as the free end portion (the right-side end portion of the storage box 20 in figures) is pushed toward a fixation end portion of the storage box 20 (the left-side end portion of the storage box 20 in figures), and thus a distance between each of the partition panels 21 is gradually reduced. Finally, the partition panels 21 overlap, and thus a length of all the partition panels 21 is minimized. The storage box 20 in this maximally contracting state is fully inserted into the storage-box accommodation space 13 for accommodation.

Therefore, the space is maximally widened in the body portion 11, and thus a relatively largest-sized article L1 is stored within the body portion 11.

In an accommodated state of the storage box 20, as described above, the partition panels 21 are kept in close contact with each other by attaching forces of the first holding member 23. Therefore, the storage box 20 is stably accommodated, in a state of contracting to a minimal length, within the storage-box accommodation space 13. At this point, the accommodated state of the storage box 20 is maintained more stably by an attaching force of the third holding member 26 provided on the lower portion of the partition panel 21 that serves as the free end portion of the storage box 20.

FIG. 7 is a view illustrating a state where the storage box 20 is caused to expand to a maximum length by pulling the partition panel 21 that serves as the free end portion of the storage box 20, outward from the storage-box accommodation space 13. At this point, the partition panel 21 that serves as the free end portion is attached to the sidewall space, facing the second holding member 24, of the body portion 11 by an attaching force of the second holding member 24. Thus, the storage box 20 may maintain a maximally expanding state. At this point, the third holding member 26 causes the storage box 20 to maintain the maximally expanding state more firmly.

The maximally expanding state is a state where the connection portion 22 connecting the partition panels 21 expands fully, that is, a state where an individual space between each of the partition panels 21 expands maximally. At this point, an article L2 that has a length corresponding to a length of a space between each of the partition panels 21 is stored in such a space. Of course, an article that has a smaller size than the article L2 is stored in each of the spaces.

FIG. 8 is a view illustrating a state where the storage box 20 is caused to expand to an appropriate length according to a size or a volume of an article that needs to be stored. At this point, only one or several of the partition panels 21 is pulled outward from the storage-box accommodation space 13. In such a case, the partition panel 21 that serves as the free end portion of the storage box 20 is positioned at an arbitrary place along a traverse direction of the bottom surface of the body portion 11. At this point, a fixed state of the partition panel 21 that serves as the free end portion is maintained only by the attaching force occurring by the third holding member 26 provided on the lower portion of the partition panel 21 that serves as the free end portion of the storage box 20. The attaching force occurring by the third holding member 26 is so sufficient that the shape of the storage box 20 can be maintained in such a manner that the article is storable in the storage box 20.

At this point, the storage box 20 forms a smaller number of storage spaces when expanding partly than when expanding fully. Therefore, the article L2 is stored in the formed space. In addition, in such a case, a space that is not occupied by the storage box 20 in the body portion 11 may also be utilized as a storage space for storing one other article L3.

A frunk trim 10 according to the present invention, as described above, includes therein the storage box 20 that possibly contracts and expands without any restriction. Therefore, the length by which the storage box 20 expands is adjusted whenever necessary, and thus articles having various different sizes is stored in spaces in the storage box 20 or in spaces outside the storage box 20. Particularly, after articles are stored within the storage box 20, the storage box 20 is caused to contract in a manner that is suitable for a length of the stored articles. Thus, the partition panels 21 may support the stored article. With this support, although vibration occurs while the vehicle travels, the stored states of articles is stably maintained as is without being forced out of original positions thereof.

In addition, noise can be prevented from occurring when the stored articles fall sideways or collide with each other due to the vibration of the vehicle.

The embodiment of the present invent is described above only in an exemplary manner with reference to the drawings. It would be apparent to a person of ordinary skill in the art to which the present invention pertains that various other modifications and equivalents are possible from this description. Therefore, the legitimate technical scope of the present invention should be defined by the following claims.

[Description of the Reference Numerals in the Drawings]

| | |
|---|---|
| 10: Frunk trim | 11: Body portion |
| 12: Upper panel portion | 13: Storage-box accommodation space |
| 14: Magnetic plate | 20: Storage box |
| 21: Partition panel | 21a: Lower plate |

-continued

[Description of the Reference Numerals in the Drawings]

| | |
|---|---|
| 22: Connection portion | 22a: Folding line |
| 23: First holding member | 24: Second holding member |
| 25: Magnetic plate | 26: Third holding member |
| 30: Bonnet | |

The invention claimed is:

1. A vehicle frunk trim comprising:
a body portion; and
a flexible storage box mounted on one sidewall surface of the body portion,
wherein the flexible storage box comprises:
a plurality of partition panels;
a connection a portion connecting respective flank ends of the partition panels on one side thereof, respective flank ends of the partition panels on the other side, and respective lower ends of the partition panels, and
wherein the connection portion is made of a material that is easily foldable and expandable,
wherein the first holding member attaching the partition panels to each other is installed on a flank surface of the partition panels,
a second holding member attaching an outermost partition panel that serves as a free end portion of the flexible storage box to a sidewall surface of the body portion is installed on the outermost partition panel, and
a third holding member attaching a lower plate formed on a lower end portion of the outermost partition panel to a bottom surface of the body portion is installed on the lower plate.

2. The vehicle frunk trim of claim 1, wherein the first holding member, the second holding member, and the third holding member are magnets, the partition panels are metal panels to which the magnets, respectively, are attachable, and two magnetic plates to which the second holding member and the third holding member, respectively, are attached are installed on the sidewall surface, facing the magnetic plate, of the body portion, and the bottom portion thereof, respectively.

3. The vehicle frunk trim of claim 1, wherein the first holding member, the second holding member, and the third holding member are velcro fasteners, the partition panel is inserted into a pocket made of cloth to which the velcro fastener is attached, and the second holding member and the third holding member are attached to the sidewall surface, facing the cloth, of the body portion and the bottom surface thereof, respectively.

\* \* \* \* \*